United States Patent
Schmidt (10) Patent No.: US 7,180,706 B2
(45) Date of Patent: Feb. 20, 2007

(54) MAGNETIC HEADS AND SEMICONDUCTOR DEVICES AND SURFACE PLANARIZATION PROCESSES FOR THE FABRICATION THEREOF

(75) Inventor: Markus Schmidt, Seibersbach (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/301,982

(22) Filed: Dec. 12, 2005

(65) Prior Publication Data

US 2006/0132973 A1    Jun. 22, 2006

Related U.S. Application Data

(62) Division of application No. 10/193,406, filed on Jul. 11, 2002, now Pat. No. 7,009,811.

(51) Int. Cl.
*G11B 5/127* (2006.01)
*B05D 3/00* (2006.01)
*H01L 21/311* (2006.01)

(52) U.S. Cl. .................. 360/126; 427/299; 438/699

(58) Field of Classification Search ............... 438/692, 438/694, 697, 699, 760, 780; 360/125, 126; 427/299, 487
See application file for complete search history.

(56) References Cited

U.S. PATENT DOCUMENTS

| | | | | |
|---|---|---|---|---|
| 4,619,837 A * | 10/1986 | Brown | ...... | 427/498 |
| 4,806,504 A * | 2/1989 | Cleeves | ...... | 438/699 |
| 6,030,892 A * | 2/2000 | Wu et al. | ...... | 438/633 |
| 6,140,240 A * | 10/2000 | Yang et al. | ...... | 438/692 |
| 6,251,788 B1 * | 6/2001 | Liou | ...... | 438/693 |
| 6,841,479 B2 * | 1/2005 | Cherian et al. | ...... | 438/690 |
| 7,009,811 B2 * | 3/2006 | Schmidt | ...... | 360/126 |
| 7,079,354 B1 * | 7/2006 | Fontana et al. | ...... | 360/126 |
| 2003/0169534 A1 * | 9/2003 | Emilio Santini | ...... | 360/126 |

FOREIGN PATENT DOCUMENTS

| | | | |
|---|---|---|---|
| EP | 670570 A2 * | 9/1995 | |
| EP | 747887 A2 * | 12/1996 | |
| JP | 57164413 A * | 10/1982 | |
| JP | 06028631 A * | 2/1994 | |
| JP | 06111242 A * | 4/1994 | |
| JP | 07182624 A * | 7/1995 | |
| JP | 09069207 A * | 3/1997 | |

* cited by examiner

Primary Examiner—William J Klimowicz
(74) Attorney, Agent, or Firm—Zilka-Kotab, PC (57) ABSTRACT

A magnetic head according to one embodiment includes a pole piece made of a magnetic material; one or more magnetic pedestals formed over the pole piece; an insulator material formed over the pole piece adjacent the magnetic pedestals; and one or more polymer layers formed over tops of the insulator material to form a substantially planar top surface with the magnetic pedestals.

11 Claims, 7 Drawing Sheets

MAGNETIC HEADS AND SEMICONDUCTOR DEVICES AND SURFACE PLANARIZATION PROCESSES FOR THE FABRICATION THEREOF

RELATED APPLICATIONS

This application is a divisional of U.S. patent application Ser. No. 10/193,406 filed Jul. 11, 2002, now U.S. Pat. No. 7,009,811.

BACKGROUND OF THE INVENTION

1. Field of the Invention

This invention relates generally to surface planarization processes for the fabrication of magnetic heads and other devices (such as semiconductor devices), and more particularly to processes that eliminate or reduce surface "steps" formed between different materials by selectively bonding polymer materials to one of the materials.

2. Description of the Related Art

A write head is typically combined with a magnetoresistive (MR) or giant magnetoresistive (GMR) read head to form a merged head, certain elements of which are exposed at an air bearing surface (ABS). The write head is made of first and second pole pieces having first and second pole tips, respectively, which terminate at the ABS. The first and second pole pieces are connected at the back gap by a yoke, whereas the first and second pole tips are separated by a non-magnetic gap layer. An insulation stack, which comprises a plurality of insulation layers, is sandwiched between the first and second pole pieces, and a coil layer is embedded in this insulation stack. A processing circuit is connected to the coil layer for conducting write current through the coil layer which, in turn, induces write fields in the first and second pole pieces. Thus, write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the read head.

One or more merged heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk.

Improved methods for making magnetic heads have become increasingly important for proper head fabrication and performance. Magnetic head assemblies are typically made of multiple thin film layers which are patterned to form various shaped layers in the head. Some of the layers are electroplated, while other layers are sputter deposited on a wafer substrate. Photolithography processes are typically utilized to create very small track widths for the magnetic heads, resulting in increased storage capacity in magnetic disks.

During a photolithography process, a mask image or pattern which defines the various components is focused onto a photosensitive layer using ultraviolet light. The image is focused onto the surface using an optical device of a photolithography tool, and is imprinted into the photosensitive layer. To build increasingly smaller structures, increasingly fine images must be focused onto the surface of the photosensitive layer (i.e., the optical resolution must increase). As optical resolution is increased, the depth of focus of the mask image is correspondingly narrowed due to the narrow range in depth of focus imposed by the high numerical aperture lenses in the photolithography tool. This narrowing depth of focus is often the limiting factor in the degree of resolution obtainable (and thus the smallest structures obtainable) using the photolithography tool. The extreme topography (i.e., the "hills" and "valleys" along the surfaces) exaggerates the effects of decreasing depth of focus. Thus, in order to properly focus the mask image defining sub-micron geometries onto the photosensitive layer, a precisely flat surface is desired. A precisely flat (i.e. fully planarized) surface will allow for extremely small depths of focus and, in turn, allow the definition and subsequent fabrication of extremely small structures.

Typically, a chemical mechanical polishing (CMP) is utilized as the means of reducing the topography in order to achieve adequate critical dimension (CD) control. CMP involves removing at least a portion of a sacrificial layer of dielectric material using mechanical contact between the wafer and a moving polishing pad saturated with slurry. Polishing flattens out most height differences, since high areas of topography ("hills") are removed faster than areas of low topography ("valleys"). Such polishing is the only technique with the capability of smoothing out topography over millimeter scale planarization distances.

When two or more different materials form the top surface, however, surface "steps" may remain between the materials even after CMP. It has been observed that, after the CMP process in magnetic head manufacturing, surface steps in the range of 10–300 nm remain between the materials. One surface material may be a metal and the other material may be a dielectric; these materials have very different CMP removal rates. This non-ideal situation adversely affects subsequent processing steps (e.g. photolithography steps). A non-planar surface changes the thickness distribution of the subsequently deposited materials and increases the chance that surface scattering will occur.

Figure 1:
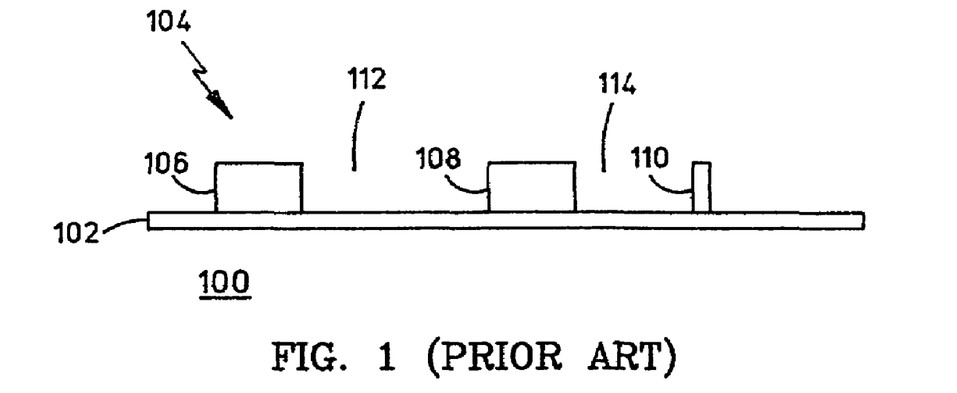
FIG. 1 is the first in a series of illustrations of FIGS. 1–3 which describe the problem of conventional surface planarization processes which utilize chemical mechanical polishing (CMP), showing more particularly a substrate having magnetic structures formed thereon.

FIG. 1 is the first in a series of illustrations of FIGS. 1–3 which describes in more detail the problem of conventionally forming a planar surface using a CMP process. An initial structure 100 includes a substrate 102 having a plurality of first material structures 104. In this example, first material structures 104 include structures 106, 108, and 110. Since structures 106, 108, and 110 cover only portions of substrate 102, recesses (such as recesses 112 and 114) are formed between structures 106, 108, and 110 and the exposed portions of substrate 102. In the fabrication of magnetic heads, substrate 102 is typically a metal or a magnetic material (such as a pole piece layer of a magnetic head) or alternatively a non-magnetic material or an insulator. First deposited material 104 is typically a metal or a magnetic material (such as a pedestal of the pole piece).

Figure 2:
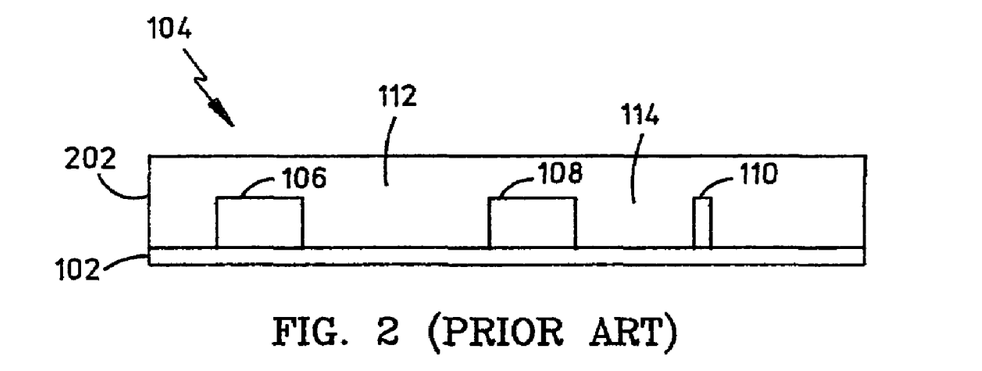
FIG. 2 is the second in a series of illustrations of FIGS. 1–3 which describe the problem of conventional surface planarization processes, showing more particularly insulator materials deposited over the magnetic structures.
Figure 3:
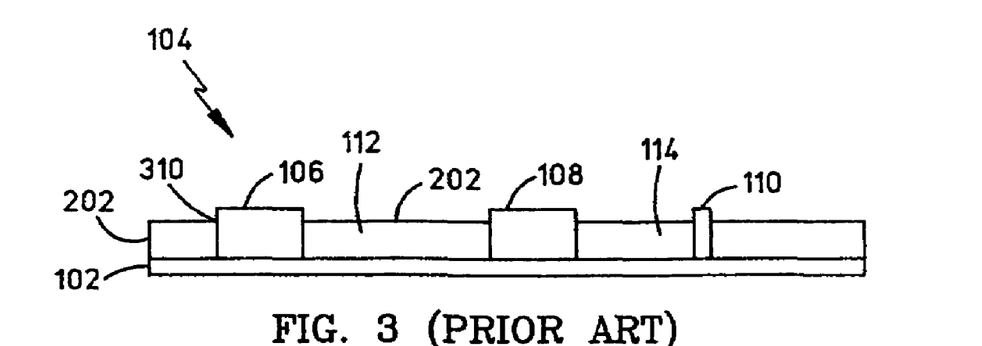
FIG. 3 is the third in a series of illustrations of FIGS. 1–3 which describe the problem of conventional surface planarization, showing more particularly the resulting structure after a CMP where small surface steps remain between the magnetic structures and insulator materials.

It is desired to fill in the recesses with a material (e.g. an insulator) in an attempt to form a top planar surface with the tops of structures 106, 108, and 110. This is done so that another material (e.g. a metal or a magnetic material) can be deposited over the surface and contact can be made with it and the tops of the first material structures 104. To illustrate, it is shown in FIG. 2 that a second material 202 is deposited over and around these first material structures 104. Second material 202 may be an insulator, such as alumina (Al$_2$O$_3$). In FIG. 3, it is shown that a chemical mechanical polishing (CMP) is performed over the structure to remove top surface portions of second material 202 such that the tops of first material structures 104 are exposed and a top surface is formed from the tops of first and second materials 104 and 202.

The top surface formed from the tops of first and second materials 104 and 202 is somewhat flat. Since first and second materials 104 and 202 have different CMP removal rates, however, small surface "steps" between these materials remain along the top surface even after the CMP (i.e., the resulting top surface is not entirely coplanar). The surface steps between first and second materials 104 and 202 (such as a step 310) may be, for example, in the range of about 10–300 nm. Again, this non-ideal situation adversely affects subsequent processing steps (e-g. photolithography steps) during the formation of the magnetic head.

Accordingly, what are needed are improved surface planarization processes for the fabrication of magnetic heads or other devices such as semiconductor devices.

SUMMARY OF THE INVENTION

A magnetic head according to one embodiment includes a pole piece made of a magnetic material; one or more magnetic pedestals formed over the pole piece; an insulator material formed over the pole piece adjacent the magnetic pedestals; and one or more polymer layers formed over tops of the insulator material to form a substantially planar top surface with the magnetic pedestals.

A magnetic recording device according to one embodiment includes at least one rotatable magnetic disk; a spindle supporting the at least one rotatable magnetic disk; a disk drive motor for rotating the at least one rotatable magnetic disk; a magnetic head for reading data from the at least one rotatable magnetic disk; and a slider for supporting the magnetic head. The magnetic head includes a pole piece made of a magnetic material; one or more magnetic pedestals formed over the pole piece; an insulator material formed over the pole piece adjacent the magnetic pedestals; and one or more polymer layers formed over tops of the insulator material to form a substantially planar top surface with the magnetic pedestals.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Figure 4:
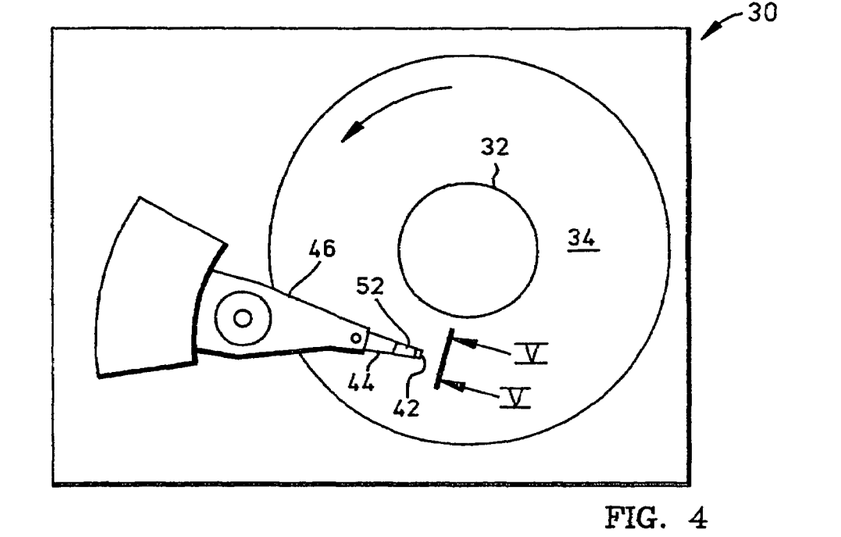
FIG. 4 is a planar view of a conventional magnetic disk drive.
Figure 5:
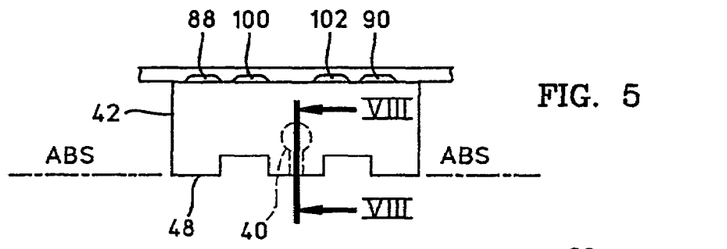
FIG. 5 is an end view of a slider with a magnetic head of the disk drive as seen in plane II—II of FIG. 4.
Figure 6:
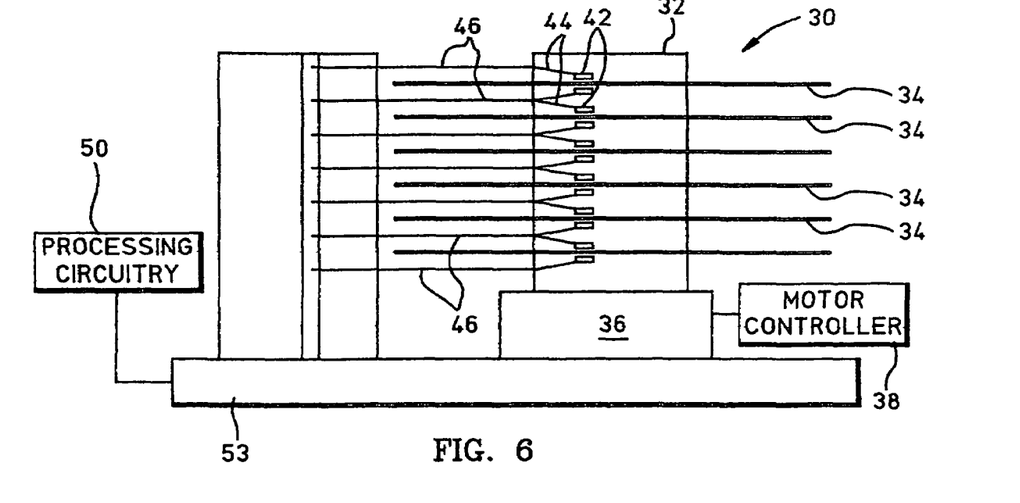
FIG. 6 is an elevation view of the magnetic disk drive wherein multiple disks and magnetic heads are employed.

The following description is the best embodiment presently contemplated for carrying out the present invention. This description is made for the purpose of illustrating the general principles of the present invention and is not meant to limit the inventive concepts claimed herein Referring now to the drawings, wherein like reference numerals designate like or similar parts throughout the several views, there is illustrated in FIGS. 4–6 a conventional magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks sliders and suspensions may be employed in a large capacity direct access storage device (DASD)), as shown in FIG. 6. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 µm cushion of air (air bearing) between the disk and an air bearing surface (ABS) 48.

Figure 7:
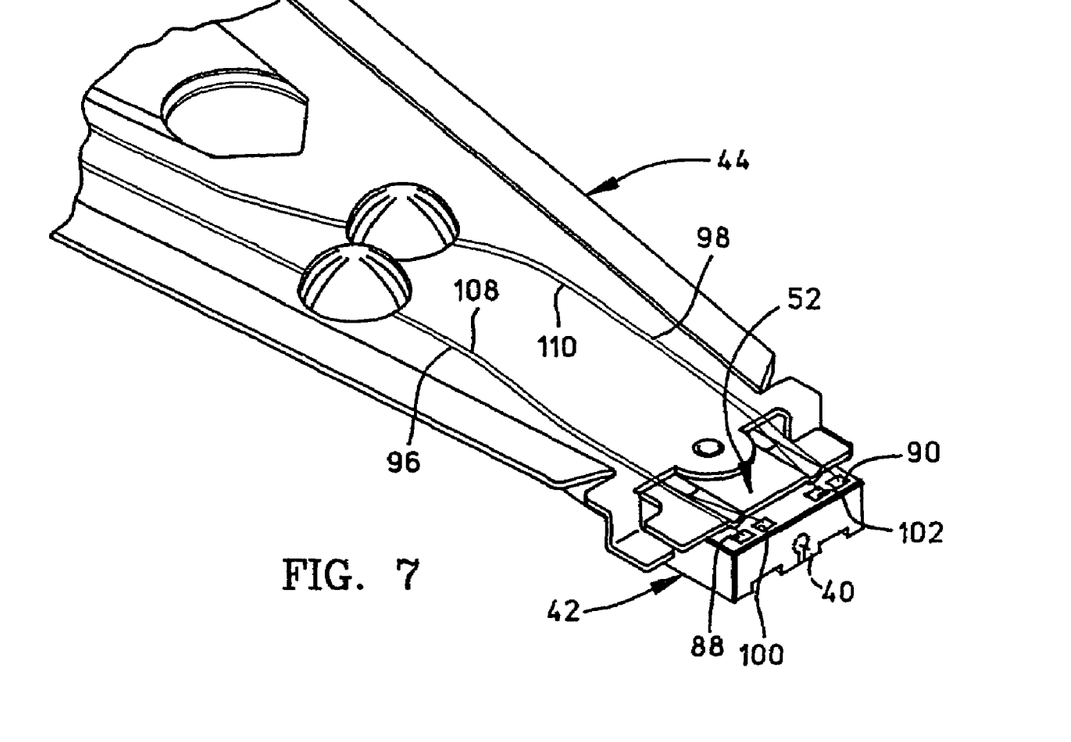
FIG. 7 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 4 and 7 the slider 42 is shown mounted to a head gimbal assembly (HGA) 52 that is mounted to the suspension 44. All of the above components are supported on a base 53.

Figure 8:
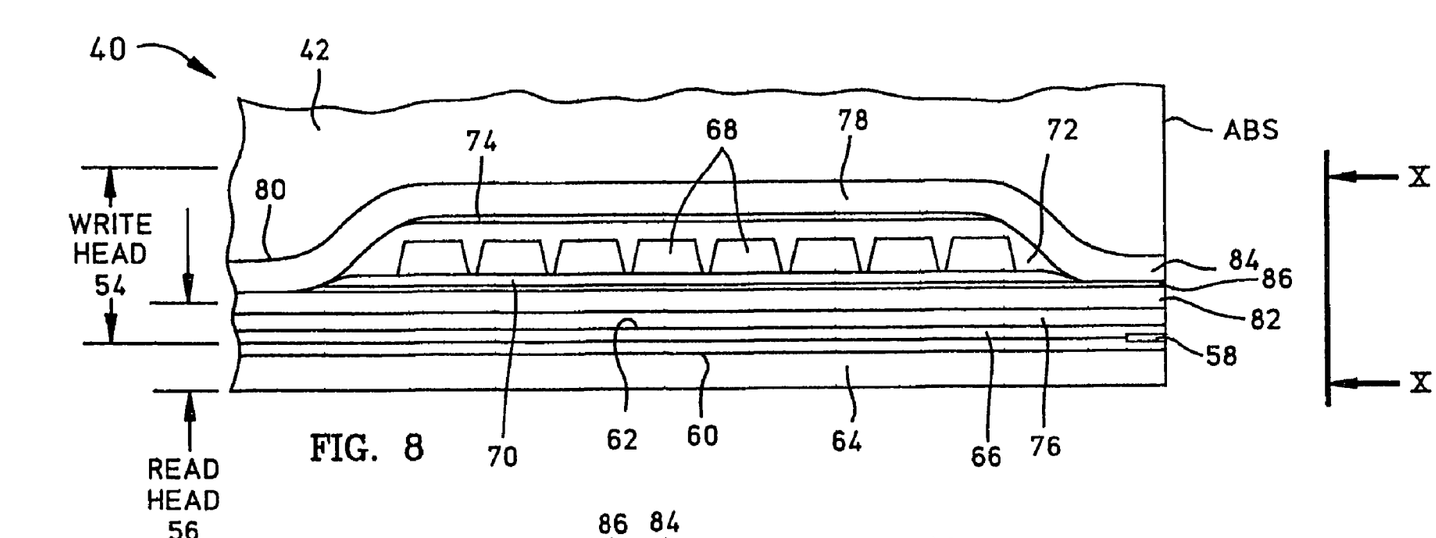
FIG. 8 is a partial elevation view of the slider and magnetic head as seen in plane V—V of FIG. 5.

FIG. 8 is a side cross-sectional elevation view of a conventional magnetic head 40 having a write head portion 54 and a read head portion 56. The read head portion includes a read sensor 58. The read sensor 58 is sandwiched between first and second gap layers 60 and 62 that are, in turn, sandwiched between first and second shield layers 64 and 66. In response to external magnetic fields, the resistance of the read sensor 58 changes. A sense current conducted through the sensor causes these resistance changes to be manifested as potential changes, which are processed by the processing circuitry 50 shown in FIG. 6.

Figure 9:
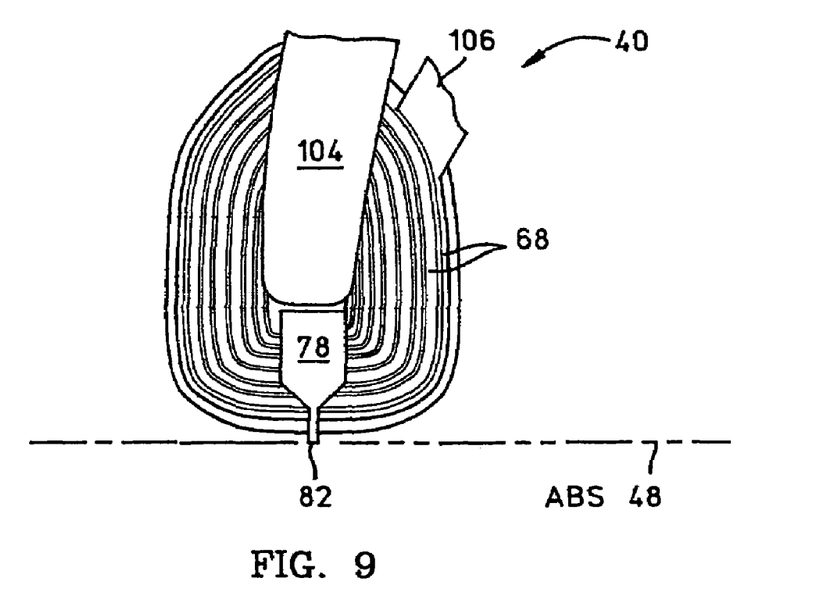
FIG. 9 is a top view of the second pole piece and coil layer, a portion of which is shown in FIG. 5, with all insulation material removed.
Figure 10:
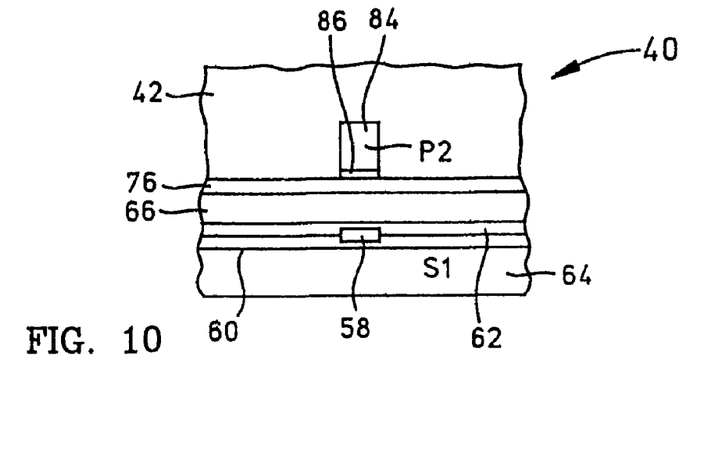
FIG. 10 is a partial ABS view of the slider taken along plane VII—VII of FIG. 8 to show the read and write elements of the magnetic head.

The write head portion 54 of the head includes a coil layer 68 sandwiched between first and second insulation layers 70 and 72 A third insulation layer 74 may be employed for planarizing the head to eliminate ripples in the second insulation layer caused by the coil layer 68. The first, second and third insulation layers are referred to as an "insulation stack". The coil layer 68, and the first, second and third insulation layers 70, 72 and 74, are sandwiched between first and second pole piece layers 76 and 78. The first and second pole piece layers 76 and 78 are magnetically connected at a back gap 80, and have first and second pole tips 82 and 84 that are separated by a non-magnetic gap layer 86 at the ABS. As shown in FIGS. 5 and 7, conductive pads 88, 90, 100, and 102 connect leads from the read sensor 58 and leads 104 and 106 from coil 68 (see FIG. 9) to leads 96,98,108, and 110 on the suspension 44.

FIGS. 11–15 are cross-sectional views of partially constructed magnetic heads for describing a surface planarization method of the present invention. The method of FIGS. 11–15 may be utilized for making a magnetic head in the disk drive described above in relation to FIGS. 4–10, This magnetic head will have a unique structure as shown and described later in relation to FIG. 15.

Figure 11:
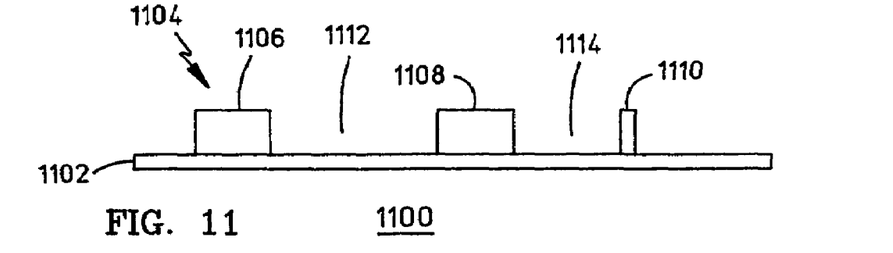
FIG. 11 is the first in a series of five illustrations of FIGS. 11–15 which describe a surface planarization process of the present invention, showing more particularly a substrate having magnetic structures formed thereon.

An initial substrate structure 1100 includes a substrate 1102 having a plurality of first material structures 1104 formed thereon. In this example, first material structures 1104 include structures 1106, 1108, and 1110. Since structures 1106, 1108, and 1110 cover only portions of substrate 1102, recesses (such as recesses 1112 and 1114) are formed between structures 1106,1108, and 1110 and the exposed portions of substrate 1102. In the fabrication of magnetic heads, substrate 1102 is typically a metal and/or a magnetic material (such as a pole piece layer of a magnetic head), whereas first deposited material 1104 is typically a metal and/or a magnetic material (such as a pedestal of the pole piece). The magnetic material may include nickel-iron (NiFe) or cobalt-iron (CoFe).

It is desired to fill in these recesses with a material (e.g. an insulator) in an attempt to form a top planar surface with the tops of structures 1106, 1108, and 1110. This is done so that another material (e.g. a metal or a magnetic material) can be deposited over the flat surface and contact can be made (i.e. physical, electrical, and/or magnetic contact) with it and the tops of the first material structures 1104.

Figure 12:
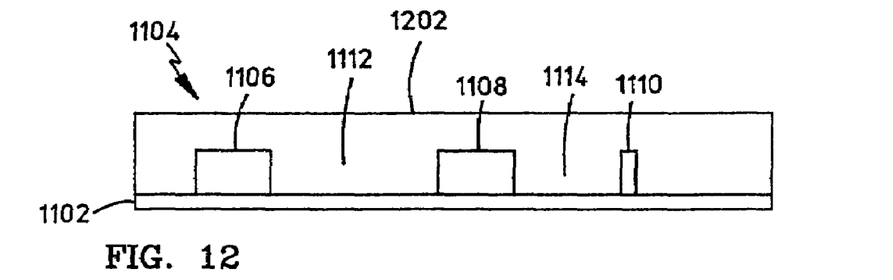
FIG. 12 is the second in a series of five illustrations of FIGS. 11–15 which describe the surface planarization process of the present invention, showing more particularly an insulator material deposited over the magnetic structures.
Figure 13:
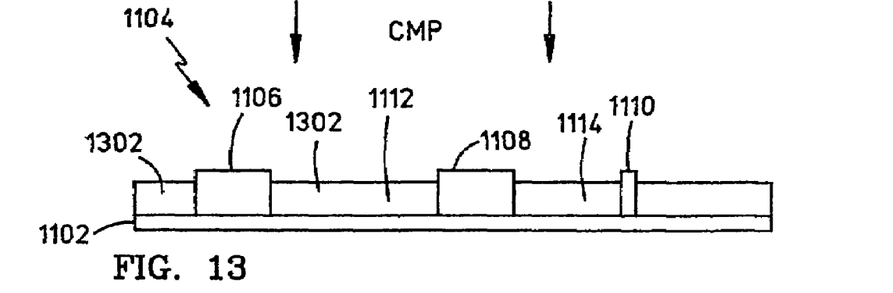
FIG. 13 is the third in a series of five illustrations of FIGS. 11–15 which describe the surface planarization process of the present invention, showing more particularly the resulting structure after a CMP where small surface steps remain between the magnetic structures and the insulator materials.

To illustrate, it is shown in FIG. 12 that a second material 1202 is deposited over and around these first material structures 1104. Second material 1202 may be an insulator, such as alumina ($Al_2O_3$). In FIG. 13, it is shown that a chemical mechanical polishing (CMP) is then performed over the structure to remove top surface portions of second material 1202 such that the tops of first material structures 1104 are exposed and a top surface (which is somewhat flat) is formed from the tops of first and second materials 1104 and 1202. However, small surface steps remain between first and second materials 1104 and 1202 along the top surface even after the CMP (i.e., the resulting top surface is not entirely coplanar). Steps remain between the materials because they have different CMP removal rates. These surface steps may be, for example, in the range of about 10–300 mn. If no other processes are utilized to reduce the size of these steps, the non-ideal situation adversely affects subsequent processing steps (e-g. photolithography steps) as described earlier.

Figure 14:
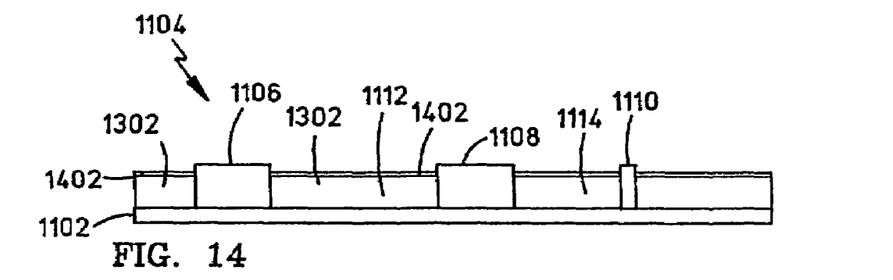
FIG. 14 is the fourth in a series of five illustrations of FIGS. 11–15 which describe the surface planarization process of the present invention, showing more particularly a polymer initiator layer selectively bonded with the tops of the insulator materials.

In FIG. 14, it is shown that a polymer initiator layer 1402 (or polymer starter) is applied and selectively absorbed only by the top surfaces of second material 1302 (i.e. the insulator). Thus, a chemical bond is formed between the tops of second material 1302 and polymer initiator layer 1402. In contrast, little or no absorption or bonding occurs between the polymer initiator and the top surfaces of first material structures 1104. Polymer initiator layer 1402 may be, for example, Azomonochlorsilane (AMCS) where a resulting silane bond is formed between the tops of second material 1302 and polymer initiator layer 1402. As another example, polymer initiator layer 1402 may be Azo-Thiol-Initiator where a resulting thiol bond is formed between the tops of second material 1302 and polymer initiator layer 1402. Polymer initiator layer 1402 may be a monomolecular layer having a thickness of one to a few nanometers (nm). The polymer starter may be applied to the structure by dipping or floating over.

Figure 15:
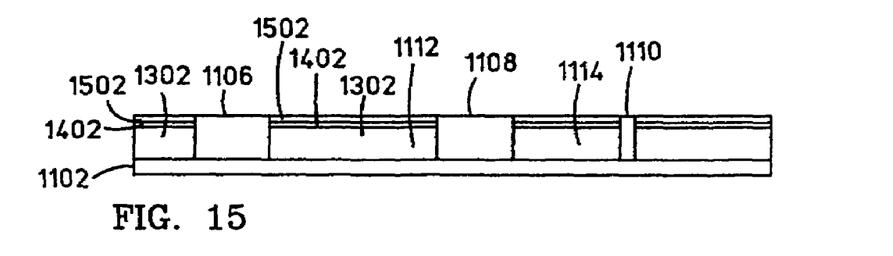
FIG. 15 is the fifth and final illustration of a series of five illustrations of FIGS. 11–15 which describe the surface planarization process of the present invention, showing more particularly a polymer layer formed with the tops of the insulator materials to a thickness sufficient such that a substantially planar top surface is formed with it and the magnetic structures.

In FIG. 15. it is shown that a polymerization process is then utilized to form polymer layers 1502 over the tops of second materials 1302. Preferably, polymer layers 1502 are formed to a thickness sufficient to reach the height of the tops of first material structures 1104. That is, the process is preferably employed such that polymer layers 1502 and first material structures 1104 from a substantially planar top surface. In the present embodiment, polymer layers 1502 have a thickness of between about 10–300 nm depending on the exact materials utilized.

Polymers are well-known in the art and may be any one of numerous natural or synthetic compounds of high molecular weight having a number of repeated linked molecules. Typically, a polymer has a molecular weight of several thousands or more (even hundreds of thousands or millions), and thus has large intermolecular forces, entangled molecular chains, and moves more slowly than small molecules. The polymerization process may utilize a monomer of styrene to form a polymer layer of polystyrene, for example. Polystyrene is a well-known vinyl polymer having a long hydrocarbon chain with a phenyl group attached to every other carbon atom. As another example, the polymerization process may use a monomer which is methyl methacrylate (MMA) which forms a polymer layer of poly(methyl methacrylate) (PMMA). However, any suitable monomer may be utilized to form any suitable polymer.

During the polymerization process, the structure of FIG. 14 is placed into a conventional polymerization reactor which is filled with the monomer. Heat is applied in the reactor so that the polymer starter is activated. A polymer chain grows on the surface until the desired thickness is achieved (i.e. to form a substantially planar or coplanar surface). Thus, the polymerization process is suitably timed so that a planarized surface results. In the present embodiment, the polymerization process may take from between 5 minutes and several hours. When complete, the application of heat is stopped and the surface is washed to remove any free polymers.

The substantially planar surface as illustrated in FIG. 15 is thereby obtained. However, this surface may have very small remaining steps between the materials, on the order of 5 nanometers (nm) for example. The substantially planar surface with eliminated or reduced-sized steps is advantageous for subsequent processing steps (e.g. photolithography steps). The thickness distribution of subsequently deposited materials will be more uniform and surface scattering is less likely to occur. After the polymerization process, a seed layer is deposited over the planar surface for a subsequent electroplating process. The seed layer may be made of a suitable metal or magnetic material, such as nickel-iron (NiFe). Contact (physical, electrical, and/or magnetic contact) between the seed layer and the tops of first material structures 1104 may thereby be achieved. The conventional electroplating process may then be performed.

FIGS. 16–19 are cross-sectional views of partially constructed magnetic heads for describing an alternative surface planarization method. The method of FIGS. 16–19 may be utilized for making a magnetic head in the disk drive described above in relation to FIGS. 4–10. The method begins with FIG. 16 which shows a partially constructed magnetic head 1600 made in the same manner as that described above in relation to FIG. 11. The initial structure 1600 includes a substrate 1602 having a plurality of first material structures 1604 formed thereon. In this example, first material structures 1604 include structures 1606, 1608, and 1610. Since structures 1606, 1608, and 1610 cover only portions of substrate 1602, recesses (such as recesses 1612 and 1614) are formed between structures 1606, 1608, and 1610 and the exposed portions of substrate 1602. In the fabrication of magnetic heads, substrate 1602 is typically a metal and/or a magnetic material (such as a pole piece layer of a magnetic head), whereas first material structures 1604 are typically a metal and/or a magnetic material (such as a pedestal of the pole piece). The magnetic material may include nickel-iron (NiFe) or cobalt-iron (CoFe).

Figure 16:
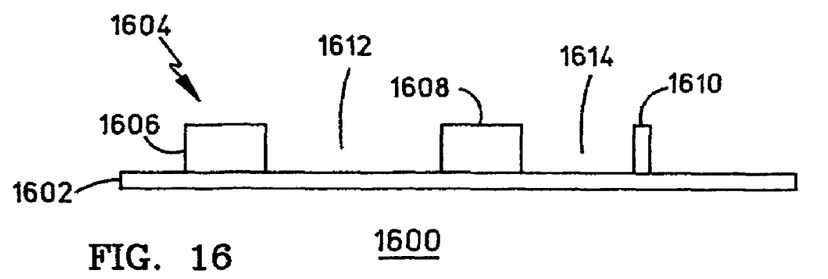
FIG. 16 is the first in a series of four illustrations of FIGS. 16–19 which describe another surface planarization process of the present invention, showing more particularly a substrate having magnetic structures formed thereon.

It is desired to fill in these recesses with a material (e.g. an insulator) in an attempt to form a top planar surface with the tops of structures 1606, 1608, and 1610. This is done so that another material (e.g. a metal and/or a magnetic material) can be deposited over the surface and contact can be made (i.e. physical, electrical, and/or magnetic contact) with it and the tops of the first material structures 1604.

Figure 17:
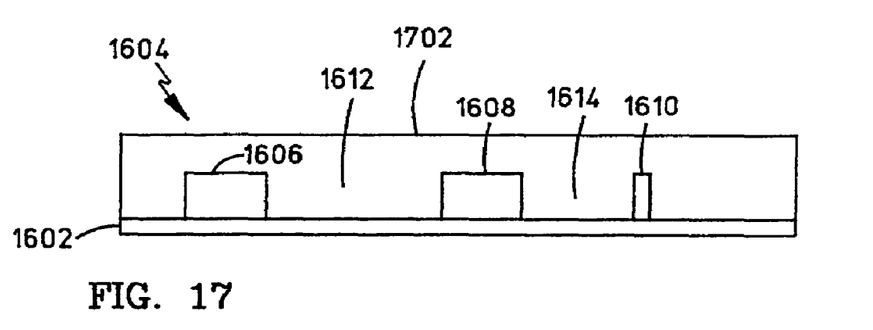
FIG. 17 is the second in a series of four illustrations of FIGS. 16–19 which describe the other surface planarization process of the present invention, showing more particularly an insulator material deposited over the magnetic structures.
Figure 18:
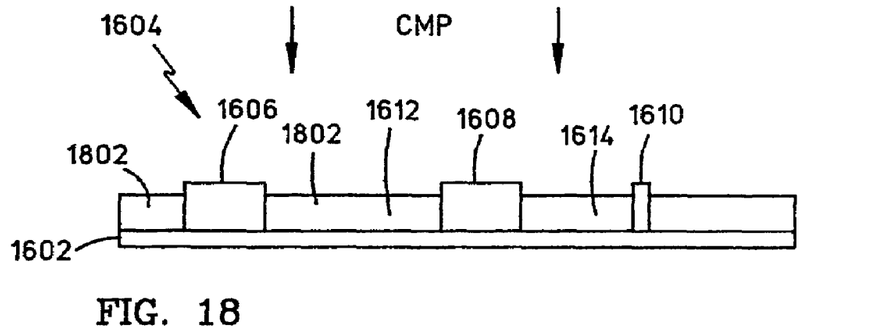
FIG. 18 is the third in a series of four illustrations of FIGS. 16–19 which describe the other surface planarization process of the present invention, showing more particularly the resulting structure after a CMP where small surface steps remain between the magnetic structures and the insulator materials.

To illustrate, it is shown in FIG. 17 that a second material 1702 is deposited over and around these first material structures 1604. Second material 1702 may be an insulator, such as alumina $Al_2O_3$). FIG. 18, it is shown that a chemical mechanical polishing (CMP) is performed over the structure to remove top surface portions of second material 1702 such that the tops of first material structures 1604 are exposed and a top surface (which is somewhat flat) is formed from the tops of first and second materials 604 and 1702. However, small surface steps remain between first and second materials 1604 and 1702 along the top surface even after the CMP (i.e., the resulting top surface is not entirely coplanar). Steps remain between the materials because they have different CMP removal rates. These surface steps may be, for example, in the range of about 10–300 nm. If no other processes are utilized to reduce the size of these steps, the non-ideal situation adversely affects subsequent processing steps (e.g. photolithography steps) as described earlier.

Figure 19:
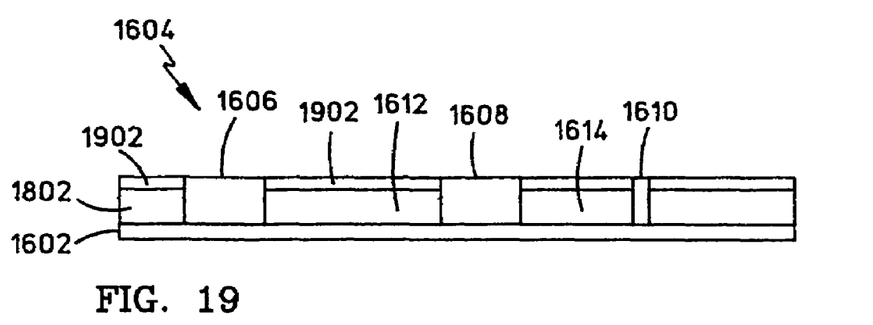
FIG. 19 is the fourth and final illustration of a series of four illustrations of FIGS. 16–19 which describe the other surface planarization process of the present invention, showing more particularly a polymer layer formed with the tops of the insulator materials to a thickness sufficient such that a substantially planar top surface is formed with it and the magnetic structures.

In FIG. 19. it is shown that polymer layers 1902 are selectively bonded over the tops of second materials 1802. The polymer layers are applied by dipping the structure of FIG. 18 into a polymer solution that has a specific headgroup that reacts with second materials 1802. Little or no absorption or bonding occurs between the polymer and the top surfaces of first material structures 1604. Preferably, polymer layers 1902 are formed to a thickness sufficient to reach the height of the tops of first material structures 1604. That is, the process is preferably employed such that polymer layers 1902 and first material structures 1604 form a substantially planar top surface. In the present embodiment, polymer layers 1902 have a thickness of between about 10–300 nm depending on the exact materials utilized. The dipping or application is done for a suitable time period to achieve the desired thickness, such as between about 2 and 200 seconds. As apparent, this process is different from that described in relation to FIGS. 11–15 in that the polymerization occurs prior to the application to the structure. The polymer may be any suitable polymer, such as a modified polystyrene (e.g. a di-block copolymer). The resulting bond between the materials may be any suitable bond, such as a silane bond or a thiol bond.

The substantially planar surface as illustrated in FIG. 19 is thereby obtained. However, this surface may have very small remaining steps between the materials, on the order of 1–5 nanometers (nm) (after processing), for example. The substantially planar surface with eliminated or reduced-sized steps is advantageous for subsequent processing steps (e-g. photolithography steps). The thickness distribution of subsequently deposited materials is more uniform and surface scattering is less likely to occur. After this polymer layers are applied, a seed layer is deposited over the planar surface for a subsequent electroplating process. The seed layer may be made of a suitable metal or magnetic material, such as nickel-iron (NiFe). Contact (physical, electrical, and/or magnetic contact) between the seed layer and the tops of first material structures 1104 is achieved. The conventional electroplating process may then be performed.

Figure 20:
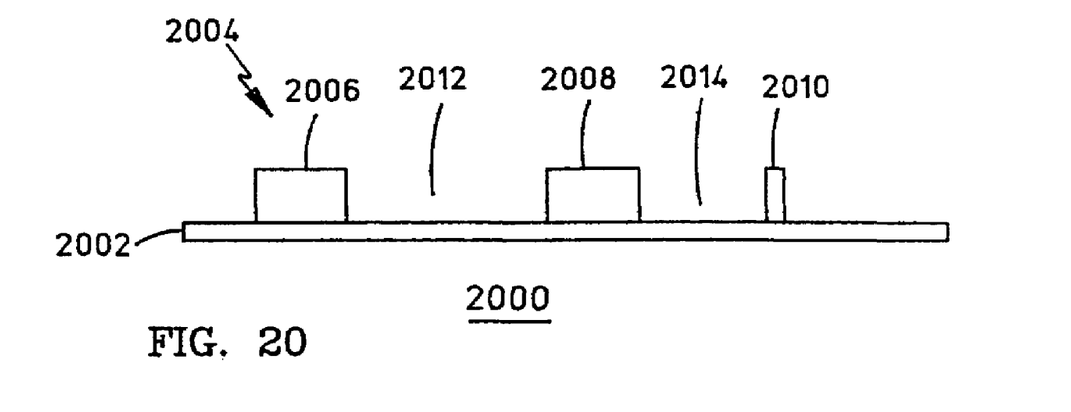
FIG. 20 is the first in a series of three illustrations of FIGS. 20–22 which describe even another surface planarization process of the present invention, showing more particularly a substrate having magnetic structures formed thereon.
Figure 21:
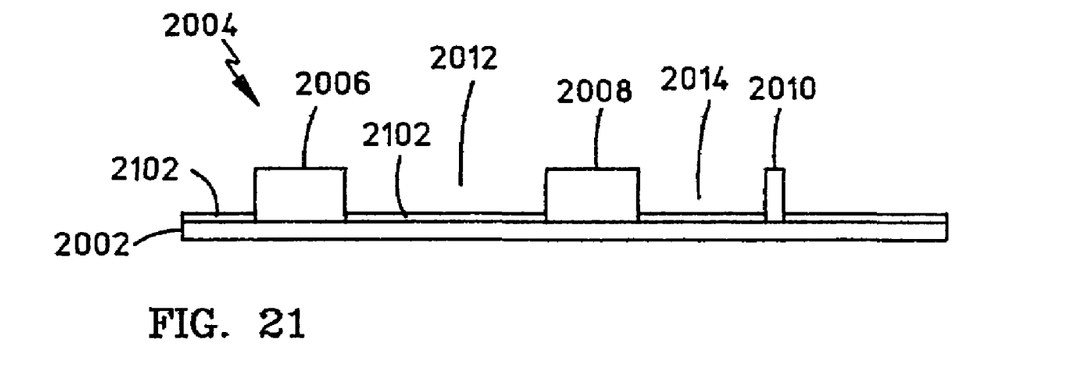
FIG. 21 is the second in a series of three illustrations of FIGS. 20–22 which describe this other surface planarization process of the present invention, showing more particularly a polymer initiator layer selectively bonded with the tops of the insulator materials.
Figure 22:
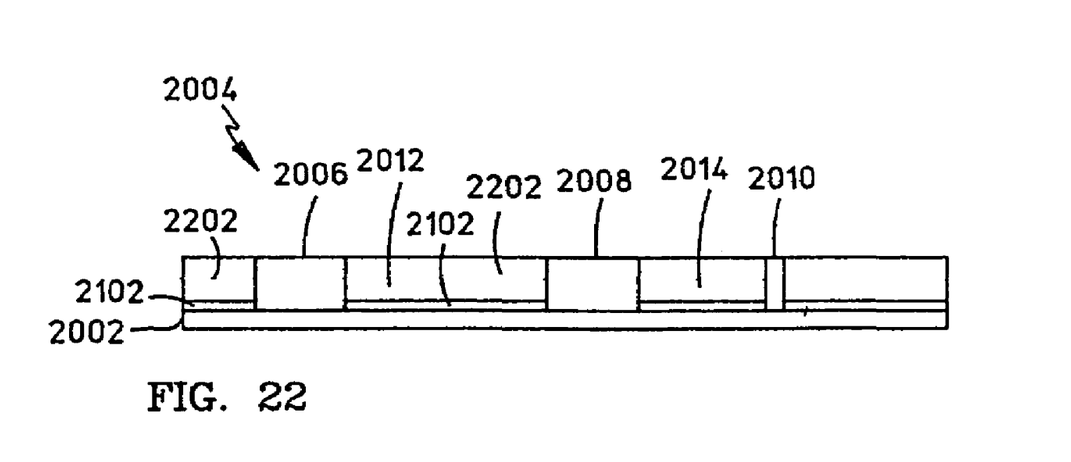
FIG. 22 is the third and final in a series of three illustrations of FIGS. 20–22 which describe the surface planarization process of the present invention, showing more particularly a polymer layer formed with the tops of the insulator materials to a thickness sufficient such that a substantially planar top surface is formed with it and the magnetic structures.

FIGS. 20–22 are cross-sectional views of partially constructed magnetic heads for describing another alternative inventive surface planarization technique. The method of FIGS. 20–22 may be utilized for making a magnetic head in the disk drive described above in relation to FIGS. 4–10. With the method of FIGS. 20–22, the CMP process described in the methods of FIGS. 11–15 and 16–19 is not needed. The method begins with FIG. 20 which shows a partially constructed magnetic head 2000 made in the same manner as that described above in relation to FIG. 11. The initial substrate structure 2000 includes a first material substrate 2002 having a plurality of second material structures 2004. h this example, second material structures 2004 include structures 2006, 2008, and 2010. Since structures 2006, 2008, and 2010, cover only portions of first material substrate 2002, recesses (such as recesses 2012 and 2014) are formed between second material structures 2006, 2008, and 2010 and the exposed portions of first material substrate 2002. In the fabrication of magnetic heads, first material substrate 2002 is typically an insulator, such as alumina ($Al_2O_3$), whereas second material structures 2004 are typically metal or magnetic, such as nickel-iron (NiFe) or cobalt-iron (CoFe).

In FIG. 21, it is shown that a polymer initiator layer 2102 (or polymer starter) is applied and selectively absorbed only by the top surfaces of first material substrate 2002 (i.e. the insulator). A chemical bond is formed between the tops of first material substrate 2002 and polymer initiator layer 2102. In contrast, little or no absorption or bonding occurs between the polymer initiator and the top surfaces of second material structures 2004. Polymer initiator layer 2102 may be, for example, Azomonochlorsilane (AMCS) where a resulting silane bond is formed between the tops of first material substrate 2004 and polymer initiator layer 2102. As another example, polymer initiator layer 2102 may be Azo-Thiol Compound where a resulting thiol bond is formed between the tops of first material substrate 2002 and polymer initiator layer 2102. Polymer initiator layer 2102 may be a monomolecular layer having a thickness of one to a few nanometers (nm). The polymer starter may be applied to the structure by dipping or floating over.

In FIG. 22, it is shown that a polymerization process is utilized to form polymer layers 2202 over the tops of first material substrate 2002. Preferably, polymer layers 2202 are formed to a thickness sufficient to reach the height of the tops of second material structures 2004. That is, the process is preferably employed such that polymer layers 2202 and second material structures 2004 form a substantially planar top surface. In the present embodiment, polymer layers 2202 have a thickness of between about 50 and 2000 nm. The polymerization process may use a monomer of styrene which forms a polymer layer made of polystyrene, for example. As another example, the polymerization process may use a monomer of MMA to form a polymer layer of PMMA. However, any suitable monomer may be utilized to form any suitable polymer.

During the polymerization process, the structure of FIG. 21 is placed into a conventional polymerization reactor which is filled with a suitable monomer. Heat is applied in the reactor so that the polymer starter is activated. A polymer chain grows on the surface until the desired thickness is achieved (i.e. to form a substantially planar or coplanar surface). Thus, the polymerization process is suitably timed so that a planarized surface results. In the present embodiment, the polymerization process may take between about 30 and 600 minutes. When complete, the application of heat is stopped and the surface is washed to remove any free polymers.

A substantially planar surface as illustrated in FIG. 22 is thereby obtained. This surface may have very small remaining steps between the materials, on the order of 1–5 nanometers (nm) for example. The substantially planar surface having eliminated or reduced-sized steps is advantageous for subsequent processing steps (e-g. photolithography steps). The thickness distribution of subsequently deposited materials will be more uniform and surface scattering is less likely to occur. After the polymerization process, a seed layer is deposited over the planar surface for a subsequent electroplating process. The seed layer may be made of a suitable metal or magnetic material, such as nickel-iron (NiFe). Contact (physical, electrical, and/or magnetic contact) between the seed layer and the tops of second material structures 2004 is achieved. The conventional electroplating process may then be performed.

Thus, surface planarization methods for the fabrication of magnetic heads or other devices in order to achieve good critical dimension (CD) control have been described. In one illustrative embodiment, magnetic structures are formed over a substrate and insulator materials are deposited over and around the magnetic structures. A chemical mechanical polishing (CMP) is performed to remove top portions of the insulator materials and to expose the tops of the magnetic structures such that the tops of the magnetic and insulator materials form a top surface. Due to the different CMP removal rates of the materials, small surface "steps" remain between the different materials even after the CMP, According to the invention, polymer materials (e.g. polystyrene or PMMA) are formed to selectively bond with the top of the insulator materials. The polymer materials are formed to a thickness sufficient such that the tops of the polymer and magnetic materials form a substantially planar top surface. The polymer materials may be formed by applying a polymer initiator layer to create a bond with the top of the insulator materials and subsequently performing a polymerization process. Alternatively, the polymer materials may be formed by applying a polymer solution to the structure. Since surface steps between the different materials are eliminated or substantially reduced to form a substantially planar top surface, good critical dimension (CD) control in photolithography processes can be achieved.

Unique structures also result from the inventive processes, such as a magnetic head which has a pole piece made of a magnetic material; one or more magnetic pedestals formed over the pole piece; an insulator material formed over the pole piece adjacent the magnetic pedestals; and one or more polymer layers formed over tops of the insulator material to form a substantially planar top surface with the magnetic pedestals. One or more polymer initiator layers may be formed between the tops of the insulator material and the one or more polymer layers. The one or more polymer layers may be made of polystyrene or PMMA, as examples. This unique magnetic head may be included within a magnetic recording device, such as a disk drive, which further includes at least one rotatable magnetic disk; a spindle supporting the at least one rotatable magnetic disk; a disk drive motor for rotating the at least one rotatable magnetic disk; and a slider for supporting the magnetic head.

It is to be understood that the above is merely a description of preferred embodiments of the invention and that various changes, alterations, and variations may be made without departing from the true spirit and scope of the invention as set for in the appended claims. For example, although the methods were described in relation to the fabrication of a magnetic head, the surface planarization processes may be utilized for the fabrication of other devices such as semiconductor ICs. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
   a pole piece made of a magnetic material;
   one or more magnetic pedestals formed over the pole piece:
   an insulator material formed over the pole piece adjacent the one or more magnetic pedestals; and
   multiple polymer layers formed over tops of the insulator material to form a substantially planar top surface with the one or more magnetic pedestals.

2. The magnetic head of claim 1, further comprising:
   one or more polymer initiator layers formed between the tops of the insulator material and the multiple polymer layers, the one or more polymer initiator layers having a different composition than the multiple polymer layers.

3. The magnetic head of claim 1, wherein the multiple polymer layers comprise polystyrene.

4. The magnetic head of claim 1 wherein the multiple polymer layers comprise poly(methyl methacrylate) or PMMA.

5. A magnetic recording device, comprising:
   at least one rotatable magnetic disk;
   a spindle supporting the at least one rotatable magnetic disk;
   a disk drive motor for rotating the at least one rotatable magnetic disk;
   a magnetic head for reading data from the at least one rotatable magnetic disk;
   a slider for supporting the magnetic head;
   the magnetic head including:
      a pole piece made of a magnetic material;
      one or more magnetic pedestals formed over the pole piece;
      an insulator material formed over the pole piece adjacent the one or more magnetic pedestals; and
      multiple polymer layers formed over tops of the insulator material to form a substantially planar top surface with the one or more magnetic pedestals.

6. The magnetic recording device of claim 5. further comprising:
   one or more polymer initiator layers formed between the tops of the insulator material and the multiple polymer layers, the one or more polymer initiator layers having a different composition than the multiple polymer layers.

7. The magnetic recording device of claim 5, wherein the multiple polymer layers comprise polystyrene.

8. The magnetic recording device of claim 5, wherein the multiple polymer layers comprise poly(methyl methacrylate) or PMMA.

9. A magnetic head, comprising:
   a pole piece made of a magnetic material;
   one or more magnetic pedestals formed over the pole piece;
   an insulator material formed over the pole piece adjacent the magnetic pedestals; and
   one or more polymer layers formed over tops of the insulator material to form a substantially planar top surface with the magnetic pedestals,
   wherein the one or more polymer layers comprise polystyrene or poly(methl methacrylate).

10. The magnetic head of claim 9, further comprising:
    one or more polymer initiator layers formed between the tops of the insulator material and the one or more polymer layers.

11. The magnetic head of claim 10, wherein the one or more polymer initiator layers have a different composition than the one or more polymer layers.

* * * * *